United States Patent [19]
Keshavachar

[11] Patent Number: 6,101,388
[45] Date of Patent: *Aug. 8, 2000

[54] METHOD FOR REDUCING REGISTRATION TRAFFIC IN A GSM SYSTEM

[75] Inventor: Bhaktha Keshavachar, Chandler, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/899,830

[22] Filed: Jul. 24, 1997

[51] Int. Cl.[7] .................................................. H04Q 7/00
[52] U.S. Cl. ............................................................ 455/435
[58] Field of Search ..................................... 455/435, 432, 455/433, 552, 458, 434

[56] References Cited

U.S. PATENT DOCUMENTS

| | | |
|---|---|---|
| 4,876,738 | 10/1989 | Selby ........................................ 455/435 |
| 5,212,822 | 5/1993 | Fukumine et al. ....................... 455/435 |
| 5,442,806 | 8/1995 | Barber et al. ............................ 455/435 |
| 5,649,286 | 7/1997 | Frerking ................................... 455/435 |
| 5,694,393 | 12/1997 | Kaye ...................................... 455/33.1 |
| 5,732,350 | 3/1998 | Marko et al. ........................... 455/435 |
| 5,761,618 | 6/1998 | Lynch et al. ............................ 455/435 |
| 5,787,349 | 7/1998 | Taketsugu ............................... 455/435 |
| 5,790,953 | 8/1998 | Wang et al. ............................ 455/435 |
| 5,832,381 | 11/1998 | Kauppi .................................. 455/435 |
| 5,842,127 | 11/1998 | Pashtan et al. ......................... 455/435 |
| 5,875,400 | 2/1999 | Madhavapeddy et al. ............. 455/435 |

Primary Examiner—Emanuel Todd Voeltz
Assistant Examiner—M. David Sofocleous
Attorney, Agent, or Firm—Blakely, Sokoloff, Taylor & Zafman LLP

[57] ABSTRACT

A method including the steps of receiving a location area change notification from a mobile, customizing a custom location area index table based on the location area change notification, and transferring the custom location area index table to the mobile if the mobile supports the custom location area index table.

11 Claims, 6 Drawing Sheets

METHOD FOR REDUCING REGISTRATION TRAFFIC IN A GSM SYSTEM

BACKGROUND OF THE INVENTION

1. Field of the Invention

The present invention relates to the field of wireless communication networks. Specifically, the present invention is directed at conserving battery power for a cellular telephone and reducing registration traffic in a cellular telephone system.

2. Description of Related Art

In the prior art GSM System, a service area, which can be a metropolitan city, is subdivided into location areas. Each location area contains one or more cells, each of which containing a base station which communicates with one or more mobile stations (i.e., one or more mobile telephones, each referred to as a "mobile"). The base stations, in turn, are connected to a base station controller. In addition, a mobile switching center (MSC) is used to communicate with all the base station controllers in the GSM system and to keep track of the latest position of each of the mobiles. Thus, the MSC knows in which location area each mobile is currently located.

In many parts of the GSM system, location areas are formed by grouping geographically proximate cells together. Thus, each location area is composed of either one cell or multiple adjacent cells. The mapping of cells to location areas is defined system-wide, so the assignments of cells to location areas are the same for all users. Each location area identification (LAI) table specifies the cell to location area mapping for a respective location area. The LAI table for each location area is contained in the MSC.

The GSM system needs to know the mobile's latest position because the MSC uses that information to "page" the mobile—i.e., the location information is used to notify the mobile of an incoming call. The MSC sends the paging message only to the cells contained in the location area in which the mobile is located so as to avoid the resource wasteful technique of sending a paging message over all the cells in the GSM system. For example, when the mobile moves from a first location area to a second location area in idle mode, the mobile signals the MSC to inform the GSM system that the mobile has changed location area. subsequently, when the GSM system wants to signal the mobile, the GSM system transmits the paging message only to the cells in the location area where the mobile is currently located.

FIG. 1 illustrates a prior art LAI table set 101 containing a mapping of cells to location areas. Each location area has an associated LAI table which contains an entry for each cell that is assigned to the location area. For example, cell $X_1$, cell $X_2$, cell $X_3$ to cell $X_n$ are assigned to a first LAI table LAI X. Also, cell $Y_1$, cell $Y_2$, cell $Y_3$ to cell $Y_n$ are assigned to a second LAI table LAI Y. Cell $X_1$, cell $X_2$, cell $X_3$ to cell $X_n$ make up one continuous area while cell $Y_1$, cell $Y_2$, cell $Y_3$ to cell $Y_n$ make up a second continuous area. If there is only one cell assigned to a location area, then the LAI table for that location area would contain only one entry.

As noted above, a mobile is required to notify the system when the mobile moves from one location area to another. Specifically, a mobile must inform the MSC when the mobile moves from a first location area to another location area. This notification is termed a "registration" and occurs only if the mobile is in idle mode and the mobile happens to change location areas. The traffic resulting from the mobile notifying the MSC of the location area change is referred to as "registration traffic."

When the mobile moves from cell $X_3$, which is in location area LAI X to an adjacent cell $Y_3$, which is in location LAI Y, the mobile is required to perform a registration with the MSC.

When a call comes through for the mobile, the MSC looks up the number of the mobile, and receives information as to the location area in which the mobile is currently located. The MSC will then send a paging message to be broadcasted in the one or more cells which are contained in the location area to notify the mobile of the incoming call.

Thus, when the mobile switches location areas, it will have to register with the GSM system to update the system on the mobile's current location. However, every time the mobile performs a registration, there are two expenses on resources: one is on the use of the capacity of the system itself (i.e., use of the bandwidth, or spectrum, resources of the GSM system). The other expense is on the power resource (i.e., the power of the battery of the mobile) consumed to transmit the registration traffic.

As the mapping of cells to location areas is fixed—i.e., all users have the same LAI mapping—excess registration traffic is generated by a user who generally moves between two adjacent cells that are contained in two separate location areas. Every time the user moves from the cell in the first location area to the cell in the second location area, registration traffic is generated by the mobile of the user. Similarly, registration traffic is also generated by the mobile every time the user moves back from the cell in the second location area to the cell in the first location area. Therefore, if the user has to travel between the border of two cells, each of which belonging to a different location area, there will be registration traffic even though the mobile will generally be located in this area.

FIG. 2 is a diagram of the prior art GSM system having a location area LA1 composed of a set of cells C1, C2, and C3, each having base station transceiver BST1, BST2, and BST3, respectively, located therein. Base station transceivers BST1, BST2, and BST3 communicate with base station controller BSC1 of a set of BSCs (BSC1 through BSCn) (not shown). Set of BSCs are connected to mobile switching center MSC1 (not shown). A mobile MS1, located in cell C3, communicates with MSC1 through the use of base station BST3 and base station controller BSC1.

Also contained in FIG. 2 is a location area LA2 composed of cells C4, C5, and C6, each having base station transceivers BST4, BST5, and BST6, respectively, located therein. Base station transceivers BST4, BST5, and BST6 communicate with base station controller BSC2 of set of BSCs (BSC1 through BSCn). As discussed above, set of BSCs are connected to mobile switching center MSC1.

As described above, to allow the GSM system to locate mobile MS1, mobile MS1 is responsible for notifying mobile switching center MSC1 every time mobile MS1 moves from one location area to another. For example, in FIG. 2, as mobile MS1 moves out of cell C3, which is a cell in the current location area, into cell C5, which is a cell in the surrounding location area, mobile MS1 will register with MSC1.

Also as noted above, registration traffic will be generated when a user who is generally located in one area made up of two adjacent cells, each from different location areas—e.g., cell C3 in location area LA1 and cell C5 in location area LA2—moves between the two cells constantly. This movement will generate registration traffic due to the fact that the movement profile of the user is not matched to the location area definition. Thus, it would be desirable to reduce this registration traffic on the network and allow the mobile to save power.

SUMMARY OF THE INVENTION

A method including the steps of receiving a location area change notification from a mobile, customizing a custom location area index table based on the location area change notification, and transferring the custom location area index table to the mobile if the mobile supports the custom location area index table.

Other features and advantages of the invention will be apparent from the accompanying drawings, and from the detailed description that follows below.

DETAILED DESCRIPTION OF THE INVENTION

To reduce registration traffic, a GSM system configured in accordance to the present invention creates custom LAI tables for each mobile. The custom LAI table contains cell entries for the cells in which the mobile is generally located and is dynamically updated to reflect the movement profile of the mobile. The custom LAI table is initiated with a default set of values and is transferred to the mobile when necessary.

Figure 1:
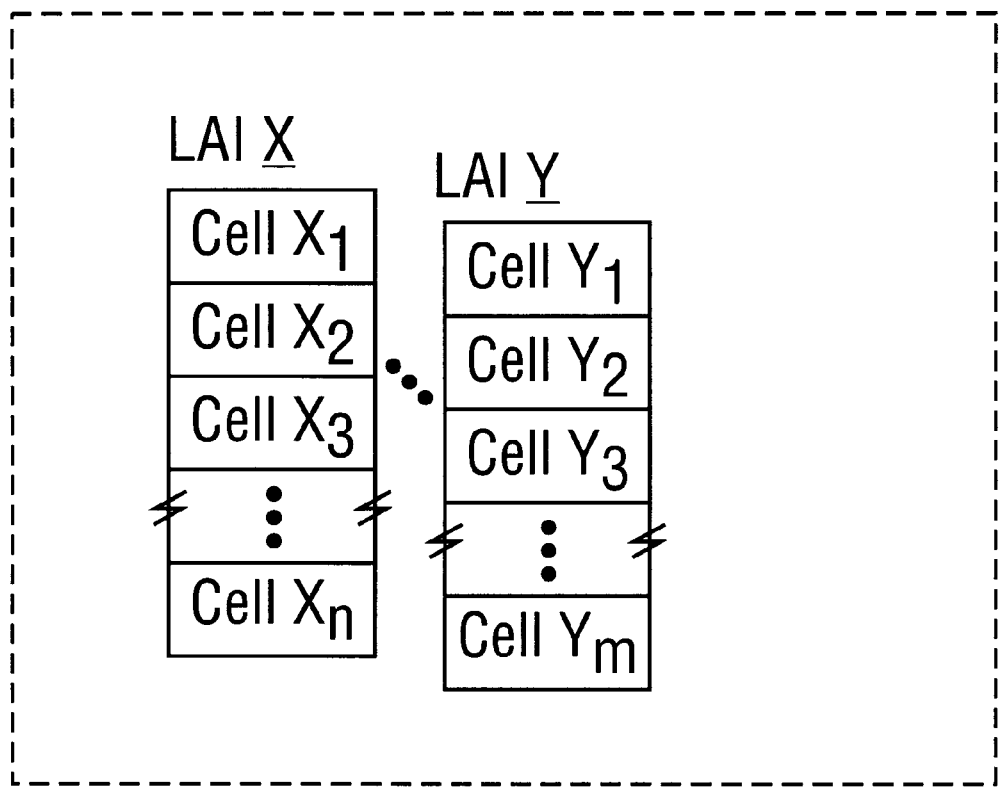
FIG. 1 illustrates a prior art data structure containing a set of location area identification tables.
Figure 2:
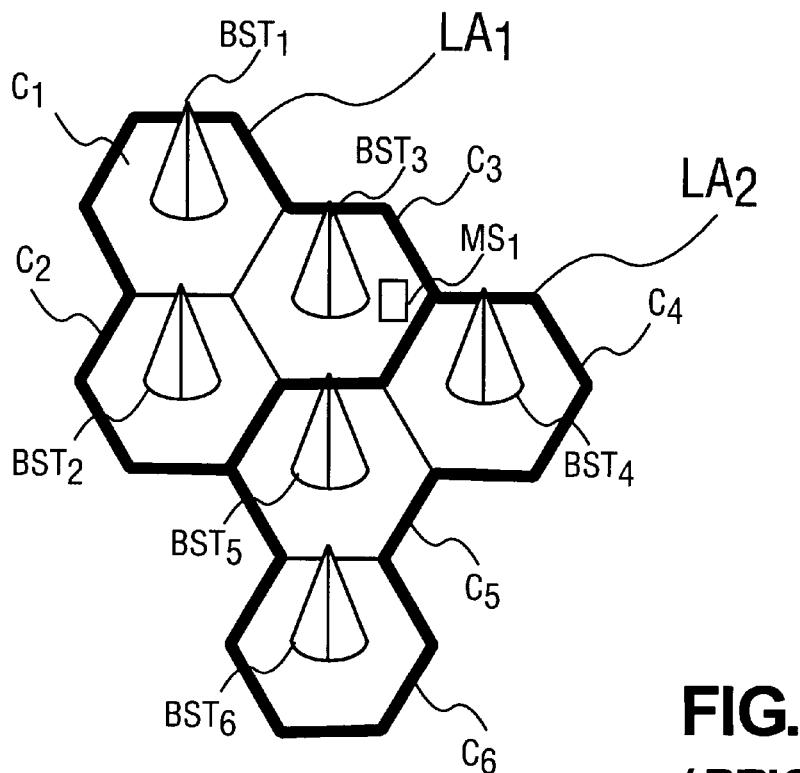
FIG. 2 is a diagram of a prior art GSM system location area mapping.
Figure 3:
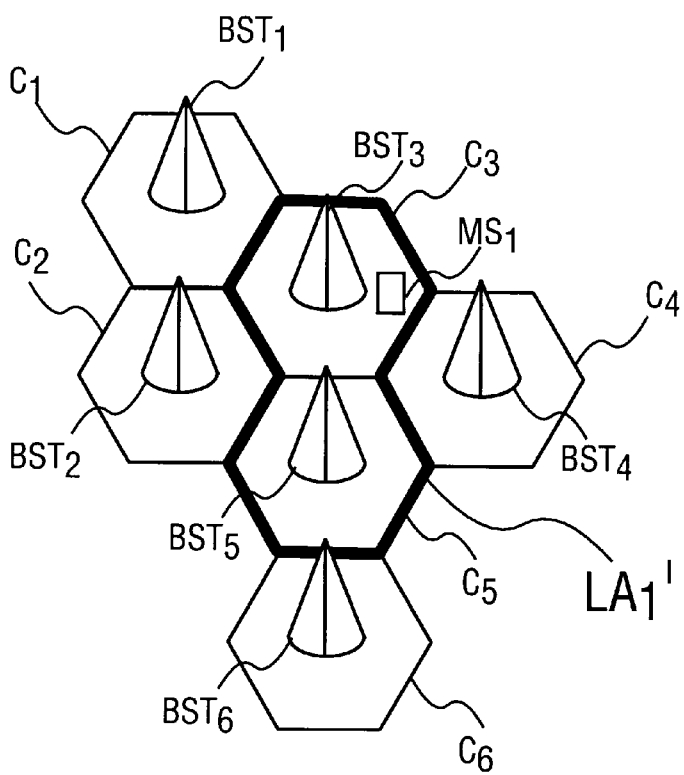
FIG. 3 is a diagram of a GSM system location area mapping configured in accordance with the present invention.

FIG. 3 is a diagram of a custom location area generated to match the movement profile of mobile MS1 where cell C3 and cell C4 has been grouped into a custom location area LA1'. Thus, no registration traffic will be generated even if mobile MS1 constantly moves between cell C3 and cell C5 as they are now contained in one location area. Moreover, if mobile MS1 constantly moves to and from another cell other than cell C3 and cell C5, then that other cell can also be added to the custom location area.

Figure 4:
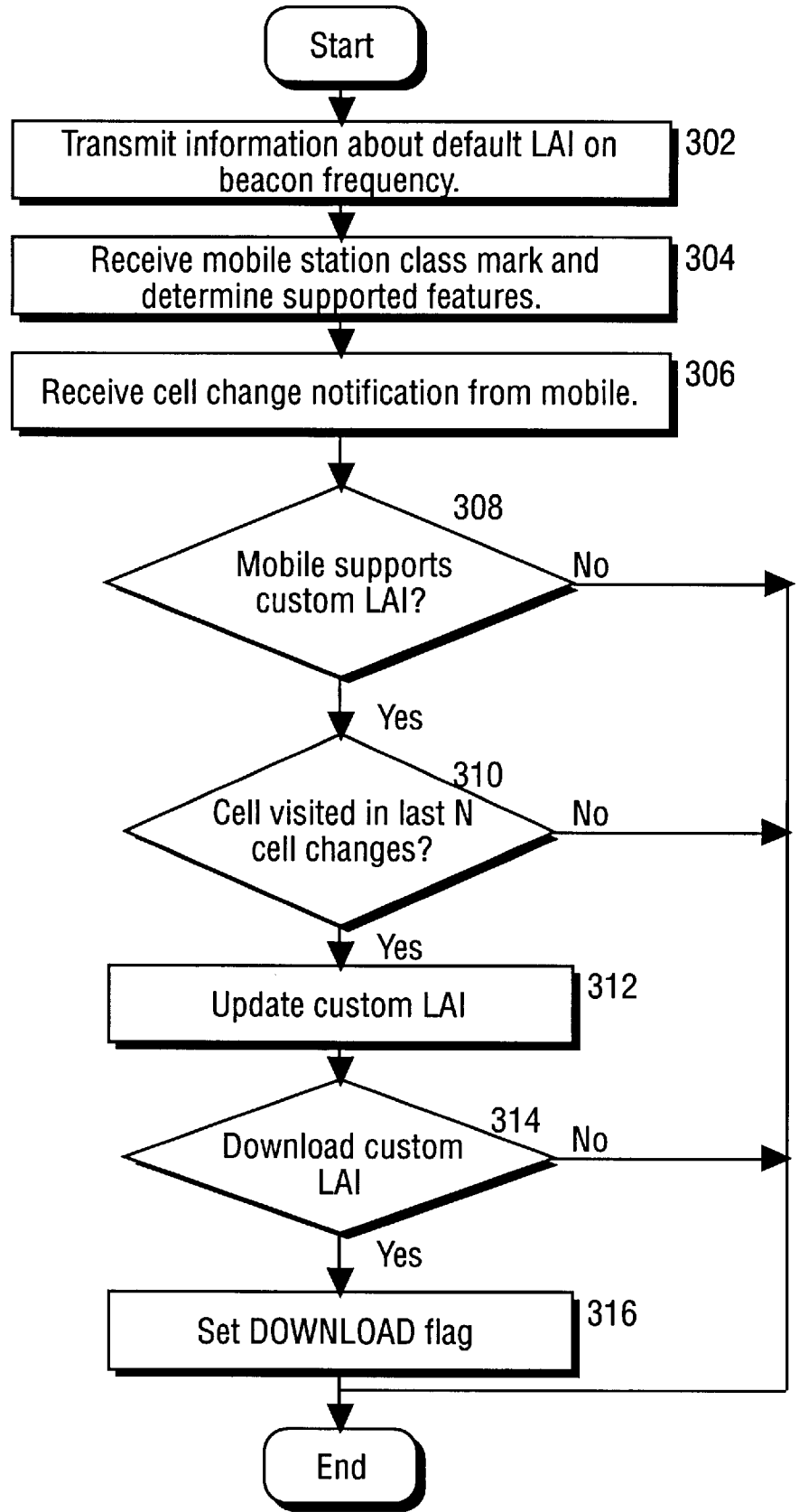
FIG. 4 is a flow diagram illustrating the operation of a GSM system configured in accordance with the present invention.

FIG. 4 illustrates one process describing the custom dynamic mapping of cells to location areas for each user. The process described in FIG. 4 is directed towards a single user. However, it will be appreciated by one of reasonable skill in the art that the process can be applied to multiple users.

The process begins when the user activates a mobile in a specific cell. The mobile immediately begins to scan the beacon frequency of the specific cell, which contains information such as identification information of the cell, the location area identification (LAI)of the location area in which the current cell is contained, and a list of cells which belong to the location area. As stated above, the LAI of the current location area, and the list of cells contained in the current location area is contained in the location area identification (LAI) table.

In block 302, the cell in which the mobile is located transmits the default LAI table for the cell on the beacon frequency. This LAI table can be similar to the prior art LAI table or any table suitable for the GSM system. As in prior art systems, this default LAI information is broadcasted to the mobile of the user on the beacon frequency of the cell in which the user is currently located. In addition, the default LAI information is broadcasted in a specified portion of the beacon signal. Thus, the mobile, when it initializes, will receive and store the default LAI table.

In block 304, the MSC receives information from the mobile which indicates the capabilities of the mobile. This information is called the mobile station class mark and allows the MSC to determine if the mobile supports custom LAI tables. If the mobile supports custom LAI tables, then, as explained below, the MSC can download a custom LAI table to the mobile which will override the default LAI table that the mobile received in block 302, above. It is important to determine whether or not a mobile supports custom LAI table as a transmission of the custom LAI table to a non-supporting mobile will be wasteful if the mobile does not support the replacement of the default LAI table which was transmitted in the beacon signal. After the station class mark is stored, operation then continues with block 306.

In block 306, the MSC receives a LAI change notification from the mobile. The mobile reports the LAI change to the MSC so that when there is an incoming call to the mobile, the MSC sends the paging message only to the cells in the LAI in which the mobile is located. The mobile reports only LAI changes and not cell changes. The MSC determines (estimates) from the LAI changes how many times the mobile has visited the same cell(s). Thus, cell changes are not reported to the MSC but are inferred from the reported LAI changes.

In block 308, the MSC determines if the mobile is capable of supporting custom LAI tables. The MSC determines this by examining the mobile station class mark, which was received in block 304. If the mobile supports custom LAI tables, then operation will continue block 310. If the mobile does not support a custom LAI, then operations will end.

In block 310, the MSC has determined that the mobile supports custom LAI tables. Thus, the MSC will process the cell change notification received in block 306, above, and determine if the cell to which the mobile has changed is a cell that was visited in the last N cell changes.

Thus, the MSC will determine if the mobile has revisited a cell within the last N+1 cell changes. If the mobile has revisited a cell within the last N+1 cell changes, the MSC will add the new cell into the custom LAI table of the mobile as the cell is one which the mobile is predicted to visit often. If a cell entry for the cell is already in the custom LAI table, then the MSC will not add an entry to the custom LAI table for that cell.

In the preferred embodiment, each custom LAI table can contain M cell entries, where the value of M is equal to the value of N. As each new cell is added to the custom LAI table, the MSC will determine if the addition of the cell entry will exceed the total number of entries in the custom LAI table. If so, then the MSC will automatically delete the earliest modified entry in the custom LAI table in accordance to a first in, first out (FIFO) fashion. Accordingly, the larger the value that is assigned to M, the more cells that the mobile will be allowed to be placed in its custom LAI table and the fewer location area registrations will be performed by the mobile. However, the value of M cannot be arbitrarily large as the paging overhead (i.e., the number of cells that broadcasts the paging message for an incoming call) increases as more cells are added to a location area. Without the present invention, the value of M is a system parameter that would otherwise have to be tuned to work with the movement profiles of all users.

The value used for M can be any number, and is an implementation detail that is determined by one who is of ordinary skill in the art. In addition, as the MSC can provide each mobile with a custom LAI table, the value of M can be different for each mobile. Thus, in that case, each mobile has a different "M" value. Moreover, the addition and removal of cell entries to the custom LAI table can be implemented in a variety of methods.

In an alternate embodiment, the addition of a cell entry to the custom LAI table would occur only if the mobile had visited the cell more than a specified number of times within the last N+1 cell changes. In a further alternate embodiment, if a cell entry already exists for the cell into which the mobile is moving, then the modification time of the cell entry will be updated as if the cell entry was just added. In yet another alternate embodiment, a cell entry for a cell is added to the custom LAI table if the mobile visits the same cell within a specified time period from the last time the cell was visited. In still yet another embodiment, a cell entry is added if the mobile has visited the cell more than a specified number of times within the N+1 cell changes and within a specified time period.

It is to be noted that any or all of these methods of cell entry or removal can be used either system-wide or on a per-mobile basis. Also, the value of M does not have to be equal to the value of N, as the number of entries contained in a location area index table does not have to be equal to the number of entries in the movement log that the MSC keeps for each mobile.

If the custom LAI table is changed based on the determination made by the MSC then operation will continue with block 312. Otherwise, operation will end.

In block 312, the MSC will update the custom LAI table to add or remove cell entries as necessary.

In block 314, the MSC determines whether to download the custom LAI table to the mobile. In a preferred embodiment, the custom LAI table is downloaded if the custom LAI table has changed, or if a predetermined period has elapsed. If it is determined that the custom LAI table is to be downloaded to the mobile, then operation continues with block 316. Otherwise, operation ends.

In block 316, as it has been decided that the MSC is to download the custom LAI table to the mobile, the MSC sets a DOWNLOAD flag to indicate that the custom LAI table is to be downloaded to the mobile. The DOWNLOAD flag is a variable that, if set, indicates to the MSC that the custom LAI table for the mobile needs to be transferred to the mobile. As a result, the MSC transmits the custom LAI table to the mobile the next time the mobile communicates with the MSC.

Figure 5:
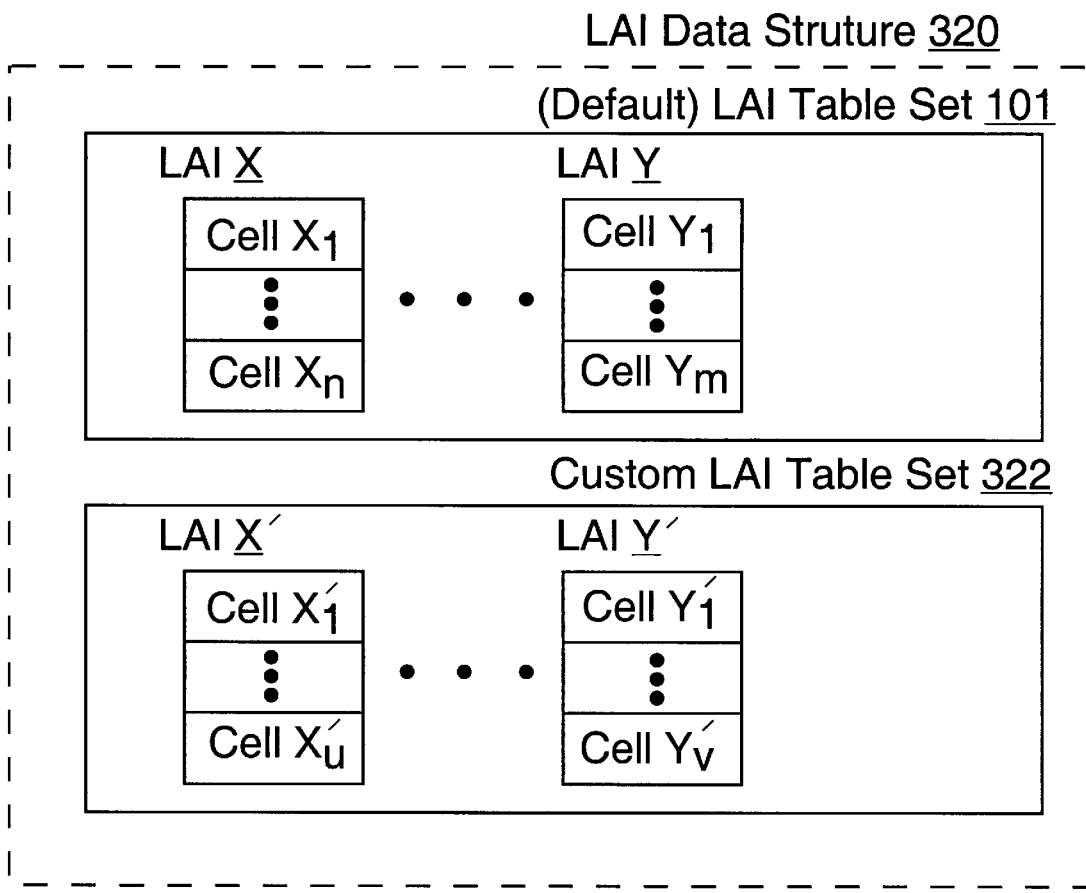
FIG. 5 illustrates a data structure containing multiple sets of location area identification tables.

FIG. 5 illustrates a LAI data structure 320 containing LAI table set 101 in addition to a custom LAI table set 322 configured as described by the flow diagram in FIG. 4, above. As described above, the LAI table set 101 is a predetermined mapping of cells to location areas described by a set of LAI tables, each LAI table belonging to a location area and having an entry for each cell that is assigned to that location area. The MSC uses the default LAI table set 101 to initialize a custom LAI table set for a mobile that does not have a stored custom LAI table set. The generation of the LAI table set 101—i.e., the mapping of cells to location areas—can be any mapping that conforms to the design requirements of the system and is an implementation detail that will not be further described herein.

Continuing to refer to FIG. 5, an exemplary custom LAI table set 322 is illustrated. Custom LAI table set 322 contains an LAI table X' containing entries for cell X1' to cell Xu'. Cell X1' to cell Xu' make up the contiguous cells in a custom location area. Custom LAI table set 322 also contains other LAI tables which contain the custom LAI table definitions for the other location areas defined for the user. For example, an LAI table Y' contains entries for cell Y1' to Yv', defining another custom location area. It is to be noted that an LAI table contains only one entry if there is only one cell contained in the location area.

In a preferred embodiment, each user would have a separate custom LAI table set contained in LAI data structure 320. The custom LAI table set would be maintained to match the movement profile of the user to decrease the amount of registration traffic that is generated.

In an alternate embodiment, the custom LAI table set does not contain a table for all the location areas, but only for the location areas which are customized or affected by the customization. For example, if the definition of a default location area (e.g., default location area 4) is changed by having one or more of its cells included in a particular custom location area (e.g., custom location area 3), then the custom LAI table set will contain a custom LAI table for the changed default location area (e.g., new custom location area 4) in addition to containing a custom LAI table for the particular customized location area (e.g., custom location area 3). As described above, the mapping of cells to location areas (i.e., the custom LAI table set) can be different for each user.

Figure 6:
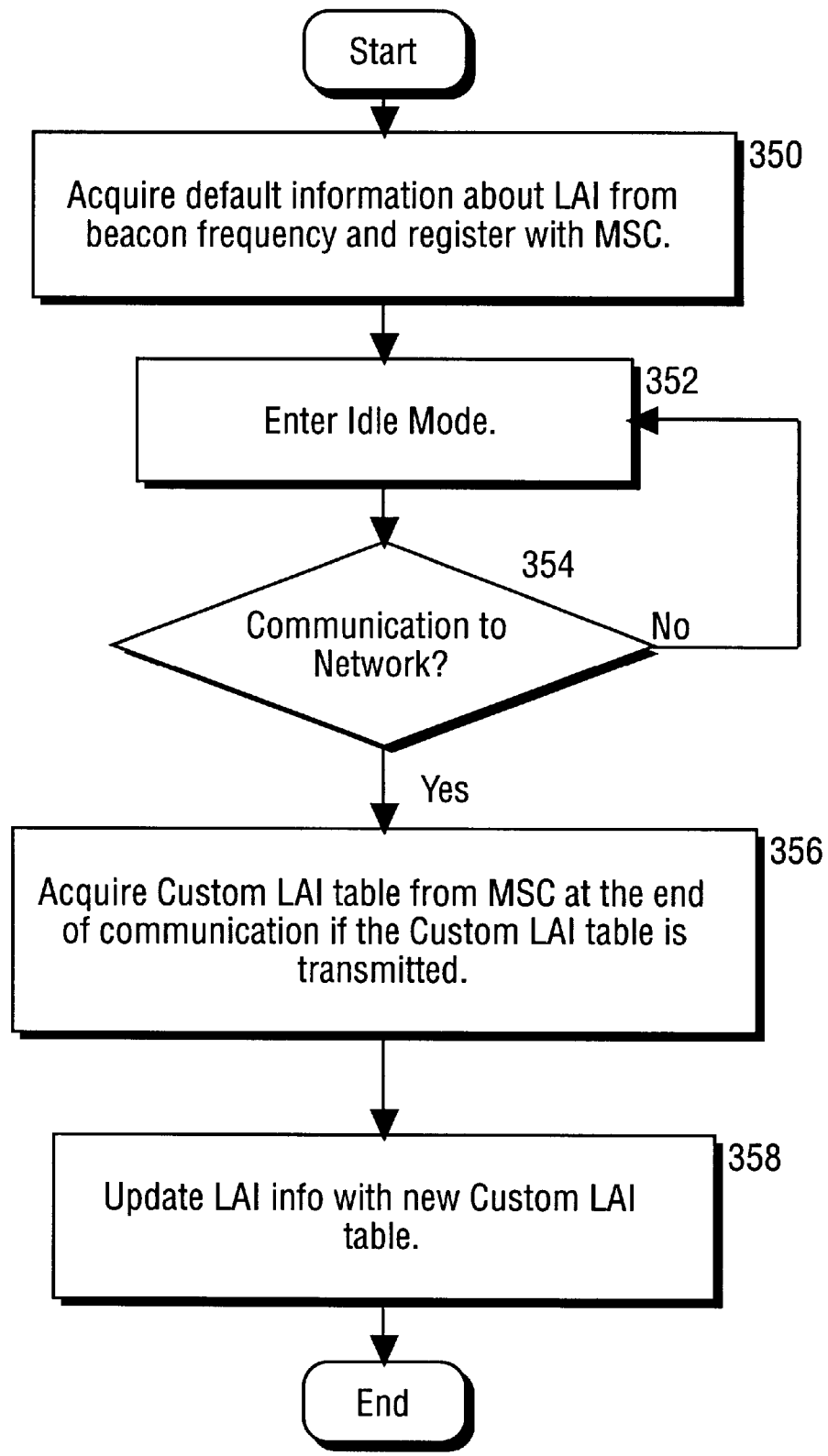
FIG. 6 is a flow diagram illustrating the operation of a mobile configured in accordance with the present invention.

FIG. 6 illustrates the operation of the mobile that corresponds to the operation of the MSC as described in FIG. 4. The description of the operation of the mobile begins after the mobile has been powered-up and begins operating but before the mobile has entered into an idle mode.

In block 350, the mobile acquires the default LAI table from the beacon signal of the current cell in addition to other information necessary for the mobile to communicate with the network. As noted in block 302 of FIG. 4, this LAI table can be similar to the LAI tables used in prior art systems. In addition, the mobile registers itself with the MSC to update the MSC on the mobile's present location and provide the MSC with the mobile's mobile station class mark. In a preferred embodiment, the mobile supports the storage and use of custom LAI tables and thus transmits an appropriate mobile station class mark to the MSC.

In block 352, the mobile enters into an idle mode. In this mode, the mobile will monitor the changing of cells due to the movement of the user. In addition, the mobile reports location area changes made by the mobile to the MSC. The communications made by the mobile is performed to allow the MSC to track the current location of the mobile. As described in block 306 through block 316 of FIG. 4, the MSC uses the LAI change information to develop custom LAI tables based on the movement of the mobile.

In block 354, the mobile determines if there is a communication to the MSC. If a communication is to be made, then operation continues with block 356. Otherwise, operation continues with block 352 and the mobile returns to idle mode.

In block 356, the mobile acquires the custom LAI table from the MSC at the end of the communication if the MSC transmits the custom LAI table based on the setting of the DOWNLOAD flag. As described in FIG. 4, the MSC will transmit the custom LAI table if the DOWNLOAD flag is set.

In block 358, the mobile will update the custom LAI table contained in the mobile to match the custom LAI table received in block 356, above. The mobile will then perform a registration when it detects that it is moving into a cell that is not contained in the new custom LAI table.

Allowing a user to use custom LAI tables ensures that, for cases where the user is generally located within a group of contiguous cells, the user will not have to cross a location boundary as often as if the default LAI table is used.

Figure 7:
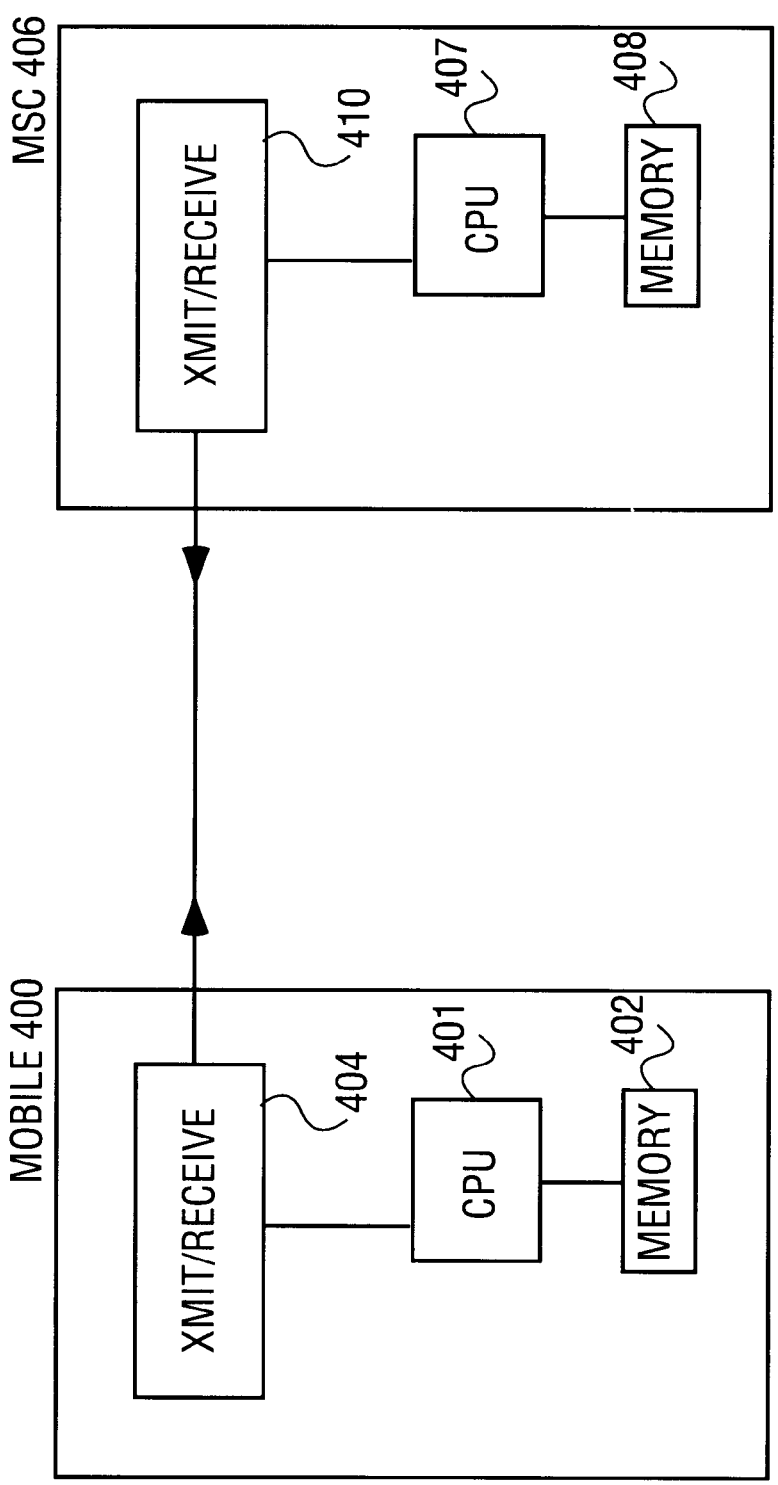
FIG. 7 is a block diagram of a mobile and a mobile switching center configured in accordance with the present invention.

FIG. 7 illustrates a mobile 400 containing a processor 401, a memory 402, and transmit and receive circuit 404. FIG. 7 also illustrates an MSC 406 containing a processor 407, a memory 408, and a transmit and receive circuit 410.

Transmit and receive circuit 404 of mobile 400 and transmit and receive circuit 410 of MSC 406 are used by mobile 400 and MSC 406 to communicate with each other and with other devices in the GSM system.

Memory 402 of mobile 400 and memory 408 of MSC 406 represent data storage elements used to store the programs and other data necessary to implement the present invention. It is to be noted that these data storage elements can consist of either volatile memory, non-volatile memory or a combination of both. Preferably, the data storage elements used to store a user's preferences and custom LAI tables are non-volatile.

Processor 401 and processor 407 controls the operation of mobile 400 and MSC 406, respectively, based on the programs contained in memory 402 and memory 408, respectively. Processor 401 and processor 407 can be either general purpose processors or custom designed integrated circuits.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:

receiving a location area change notification from a mobile;

customizing a custom location area index table based on said location area change notification; and, transferring said custom location area index table to said mobile if said mobile supports said custom location area index table, where said location area change notification includes a cell change notification for a cell and said customizing includes: (a) determining whether a first condition has occurred; and (b) adding an entry for said cell in said custom location area index table if said first condition has occurred.

2. The method of claim 1, wherein said transferring comprises:

setting a download flag to a first value; and, downloading said custom location area index table to said mobile during a subsequent communication with said mobile.

3. The method of claim 2, wherein said downloading of said custom location area index table occurs at the end of said subsequent communication with said mobile.

4. The method of claim 1, wherein said first condition is that said mobile has reported a previous cell change notification for said cell within a predetermined number of previous cell change notifications.

5. The method of claim 1, further comprising removing an oldest entry from said custom location area index table if said custom location area index table has exceeded a predetermined size.

6. An apparatus comprising:

a processor; and a memory coupled to said processor and configured to cause said processor to:

receive a location area change notification from a mobile;

customize a custom location area index table based on said location area change notification; and, transfer said custom location area index table to said mobile if said mobile supports said custom location area index table, where said location area change notification includes a cell chance notification for a cell and said memory is further configured to cause said processor to: (a) determine whether a first condition has occurred; and (b) add an entry for said cell in said custom location area index table if said first condition has occurred.

7. The apparatus of claim 6, wherein said transferring configuration of said memory causes said processor to:

set a download flag to a first value; and, download said custom location area index table to said mobile during a subsequent communication with said mobile.

8. The apparatus of claim 7, wherein said download of said custom location area index table occurs at the end of said subsequent communication with said mobile.

9. The apparatus of claim 6, wherein said first condition is that said mobile has reported a previous cell change notification for said cell within a predetermined number of previous cell change notifications.

10. The apparatus of claim 7, wherein said memory is further configured to allow said processor to remove an oldest entry from said custom location area index table if said custom location area index table has exceeded a predetermined size.

11. A method comprising:

reporting a location area change notification to a mobile switching center;

providing a mobile station class mark to said mobile switching center; and receiving a custom location area index table from said mobile switching center during a subsequent communication with said mobile switching center;

where said location area chance notification includes a cell change notification for a cell and said custom location area index table has an added entry for said cell if a first condition has been determined to have occurred.

* * * * *

UNITED STATES PATENT AND TRADEMARK OFFICE
CERTIFICATE OF CORRECTION

PATENT NO.    : 6,101,388
DATED         : August 8, 2000
INVENTOR(S)   : Keshavachar It is certified that error appears in the above-identified patent and that said Letters Patent is hereby corrected as shown below:

Column 8,
Line 29, delete "cell chance notification" and insert -- cell change notification --.

Signed and Sealed this

Seventh Day of May, 2002

Attest:

JAMES E. ROGAN
Attesting Officer        Director of the United States Patent and Trademark Office